(12) United States Patent
Yamagishi et al.

(10) Patent No.: US 8,576,799 B2
(45) Date of Patent: Nov. 5, 2013

(54) MOBILE COMMUNICATION METHOD AND MOBILE STATION

(75) Inventors: Hiroaki Yamagishi, Yokohama (JP); Masashi Kanauchi, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 162 days.

(21) Appl. No.: 13/001,092

(22) PCT Filed: Jun. 23, 2009

(86) PCT No.: PCT/JP2009/061403
§ 371 (c)(1),
(2), (4) Date: Mar. 14, 2011

(87) PCT Pub. No.: WO2009/157442
PCT Pub. Date: Dec. 30, 2009

(65) Prior Publication Data
US 2011/0182269 A1   Jul. 28, 2011

(30) Foreign Application Priority Data
Jun. 23, 2008   (JP) .................... 2008-163902

(51) Int. Cl.
*H04W 36/00* (2009.01)
(52) U.S. Cl.
USPC .......................................................... 370/331
(58) Field of Classification Search
USPC ..................... 370/254–340; 709/201–213
See application file for complete search history.

(56) References Cited

U.S. PATENT DOCUMENTS

| | | | | |
|---|---|---|---|---|
| 6,912,390 B2 * | 6/2005 | Andersson et al. | ........... | 455/436 |
| 7,242,933 B1 * | 7/2007 | Ahmavaara | .................. | 455/436 |
| 8,385,216 B1 * | 2/2013 | Shetty et al. | .................. | 370/252 |
| 8,442,026 B2 * | 5/2013 | Kanauchi et al. | ............ | 370/349 |
| 2009/0005020 A1 * | 1/2009 | McGowan et al. | ........ | 455/414.3 |

FOREIGN PATENT DOCUMENTS

WO   2004/032535 A2   4/2004

OTHER PUBLICATIONS

Office Action for Japanese Patent Application Serial No. 2008-163902 mailed Feb. 2, 2010, with English translation thereof (4 pages).
3GPP TSG-RAN WG2 Meeting #62, R2-082895, "LS on Connection recovery by NAS," TSG RAN WG2, Kansas City, USA, May 5-9, 2008 (2 pages).
3GPP TSG-RAN WG2#61 R2-081170, "Radio Link Failure recovery on non prepared eNB," NEC, Sorrento, Italy, Feb. 11-15, 2008 (9 pages).
3GPP TSG-RAN WG#61bis R2-081906, "Radio Link Failure recovery on non prepared eNB," NEC, Shenzhen, China, Mar. 31-Apr. 4, 2008 (10 pages).
Office Action for Japanese Patent Application No. 2009-220650 mailed Aug. 7, 2012, with English translation thereof (5 pages).

(Continued)

*Primary Examiner* — Ayaz Sheikh
*Assistant Examiner* — Debebe Asefa
(74) *Attorney, Agent, or Firm* — Osha Liang LLP

(57) ABSTRACT

A mobile communication method according to the present invention includes the steps of: transmitting, from an LTE-AS function to an EMM function, a reconnection request, when the LTE-AS function detects that an RRC connection is chanted to an idle state; and transmitting, at the EMM function, a service request, when the EMM function receives the reconnection request and detects that the LTE-AS function is in a coverage area.

6 Claims, 6 Drawing Sheets

(56) References Cited

OTHER PUBLICATIONS

Extended European Search Report from PCT/JP2009/061403, mailing date Dec. 19, 2012 (6 pages).
NTT DOCOMO, 3GPP TSG CT WG1 Meeting #54, "Discussion About Inter-RAT Re-Connection," Zagreb, Croatia, Jun. 23-27, 2008 (4 pages).
Examination Report in corresponding European Application No. 09770152.8 dated Mar. 18, 2013 (5 pages).
International Search Report w/translation from PCT/JP2009/061403 dated Jul. 28, 2009 (3 pages).
Written Opinion from PCT/JP2009/061403 dated Jul. 28, 2009 (3 pages).
Japanese Office Action w/translation dated Jul. 28, 2009 for Japanese Application No. 2008-163902 (3 pages).
3GPP TS 25.304 V8.2.0; "3rd Generation Partnership Project; Technical Specification Group Radio Access Network; User Equipment (UE) procedures in idle mode and procedures to cell reselection in connected mode (Release 8)"; May 2008; pp. 10-14 (6 pages).
3GPP TS 24.301 V0.1.1; "3rd Generation Partnership Project; Technical Specification Group Core Network and Terminals; Non-Access-Stratum (NAS) protocol for Evolved Packet System (EPS); Stage 3 (Release 8)"; Mar. 2008 (63 pages).
3GPP TS 36.331 V8.1.0; "3rd Generation Partnership Project; Technical Specification Group Radio Access Network; Evolved Universal Terrestrial Radio Access (E-UTRA) Radio Resource Control (RRC); Protocol specification (Release 8)"; Mar. 2008 (122 pages).

\* cited by examiner

MOBILE COMMUNICATION METHOD AND MOBILE STATION

TECHNICAL FIELD

The present invention relates to a mobile communication method in which a mobile station to perform communication via a first connection between the mobile station and a radio base station and a second connection between the radio base station and a switching center by use of a first protocol function and a second protocol function, and relates to the mobile station.

BACKGROUND ART

In a mobile communication system according to the LTE (Long Term Evolution) scheme defined by the 3GPP, an AS (Access Stratum) function (hereinafter an LTE-AS function) of a mobile station UE is configured to perform a reconnection procedure upon detection of a "Radio Link Failure" attributable to a handover failure or deterioration in radio quality.

SUMMARY OF THE INVENTION

Problems to be Solved by the Invention

Here, the LTE-AS function can perform the reconnection procedure only for a radio base station eNB (a cell) having "UE Context" of the mobile station UE.

Specifically, when the LTE-AS function transmits an "RRC Connection Reestablishment Request (a reestablishment request)" to a radio base station eNB (a cell) not having the "UE Context" of the mobile station UE, the LTE-AS function receives an "RRC Connection Reestablishment Reject (a reestablishment rejection response)". In this case, an RRC connection between the mobile station UE and the radio base station eNB is changed to an idle state without waiting for expiration of a T311 timer.

In this case, an S1 connection between the radio base station eNB and a switching center MME is maintained without being cut off because the T311 timer has not been expired. For this reason, when the switching center MME receives an incoming signal, data or the like addressed to the mobile station UE, the switching center MME transmits the incoming signal and the like to the radio base station eNB whose RRC connection with the mobile station UE is released. This produces a problem that the mobile station UE cannot receive the incoming signal and the like.

To solve this problem, the execution of a reconnection procedure by use of a NAS (Non Access Stratum) function of the mobile station UE is under study. However, a specific reconnection procedure using the NAS function of the mobile station UE has not been studied as yet.

The present invention has been made in view of the foregoing problem, and an objective thereof is to provide a mobile communication method and a mobile station which are capable of resolving the above-described defect of the LTE-AS function by defining a specific reconnection procedure performed by the NAS function of a mobile station.

A first aspect of the present invention is summarized as a mobile communication method in which a mobile station performs communication via a first connection between the mobile station and a radio base station and a second connection between the radio base station and a switching center by use of a first protocol function and a second protocol function, wherein the first protocol function performs processing corresponding to a first protocol which terminates between the mobile station and the radio base station; the second protocol function performs processing corresponding to a second protocol which is an upper protocol of the first protocol and terminates between the mobile station and the switching center; and the method includes the steps of: transmitting, from the first protocol function to the second protocol function, a reconnection request, when the first protocol function detects that the first connection is changed to an idle state; and transmitting, at the second protocol function, a service request, when the second protocol function receives the reconnection request and detects that the first protocol function is in a coverage area.

A second aspect of the present invention is summarized as a mobile station configured to perform communication via a first connection between the mobile station and a radio base station and a second connection between the radio base station and a switching center by use of a first protocol function and a second protocol function, wherein the first protocol function is configured to perform processing corresponding to a first protocol which terminates between the mobile station and the radio base station; the second protocol function is configured to perform processing corresponding to a second protocol which is an upper protocol of the first protocol and terminates between the mobile station and the switching center; the first protocol function is configured to transmit a reconnection request to the second protocol function, upon detecting that the first connection is changed to an idle state; and the second protocol function is configured to transmit a service request, when the second protocol function receives the reconnection request and detects that the first protocol function is in a coverage area.

Effect of the Invention

As described above, the present invention can provide a mobile communication method and a mobile station which are capable of resolving the above-described defect of the LTE-AS function by defining a specific reconnection procedure performed by the NAS function of a mobile station.

BEST MODES FOR CARRYING OUT THE INVENTION (Configuration of Mobile Communication System According to First Embodiment of the Present Invention)

A mobile communication system according to a first embodiment of the present invention will be described with reference to FIG. 1 to FIG. 6.

Figure 1:
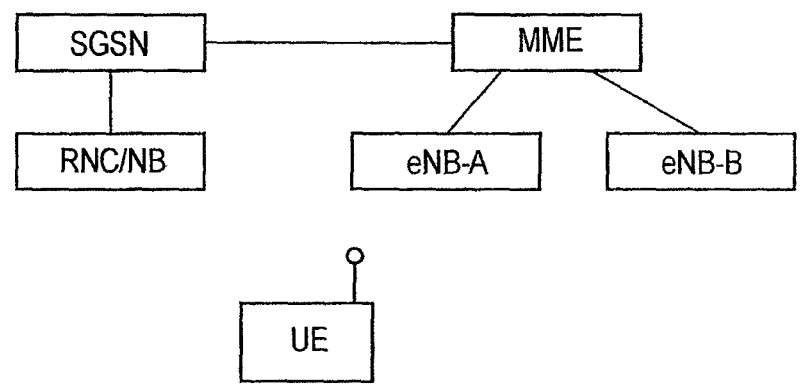
FIG. 1 is an overall configuration diagram of a mobile communication system according to a first embodiment of the present invention.

As shown in FIG. 1, the mobile communication system according to this embodiment includes a core network CN, a switching center SGSN of the UMTS (Universal Mobile Telecommunications System) scheme, a radio control station RNC of the UMTS scheme, a radio base station NB of the UMTS scheme, a switching center MME of the LTE scheme, and a radio base station eNB MME of the LTE scheme.

Figure 2:
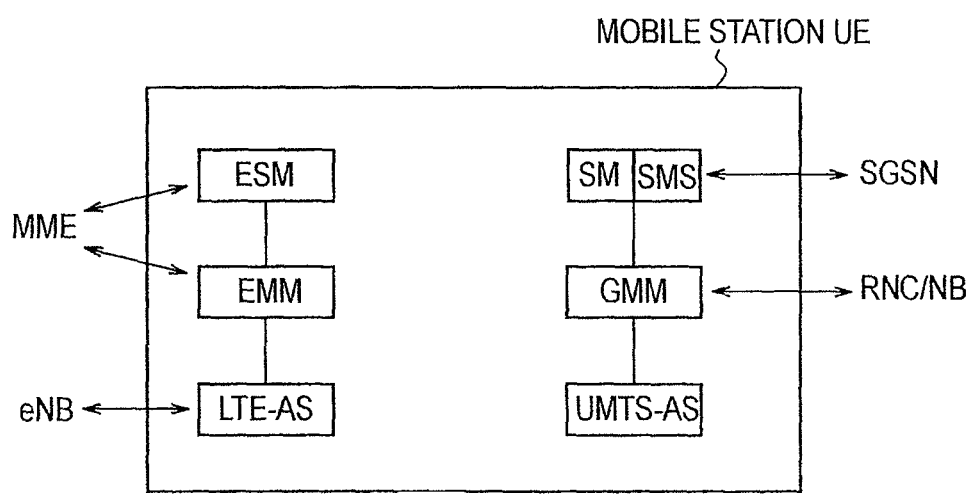
FIG. 2 is a functional block diagram of a mobile station according to the first embodiment of the present invention.

As shown in FIG. 2, a mobile station UE includes an ESM function, an EMM function and an LTE-AS function, as functions of the LTE scheme. The mobile station UE includes an SM/SMS function, a GMM function and an UMTS-AS function, as functions of the UMTS scheme.

Here, the LTE-AS function and the UMTS-AS function are configured to perform processing corresponding to an AS protocol (a first protocol) which terminates between the mobile station UE and the radio base station eNB/NB.

Meanwhile, the EMM function and the GMM function are configured to perform processing corresponding to a NAS protocol (a second protocol) which is an upper protocol of the AS protocol (the first protocol) and terminates between the mobile station UE and the switching center MME/SGSN.

Here, the mobile station UE is configured to perform communication via an RRC connection (a first connection) between the radio base station eNB/NB and mobile station UE and via an S1 connection and an Iu connection (a second connection) between the radio base station eNB/NB and the switching center MME/SGSN.

Now, operations of the mobile communication system according to this embodiment will be described below with reference to FIG. 3 to FIG. 6.

Firstly, an operation (1) to be performed when a reconnection procedure using the NAS function is normally completed in the mobile communication system according to this embodiment will be described with reference to FIG. 3.

Figure 3:
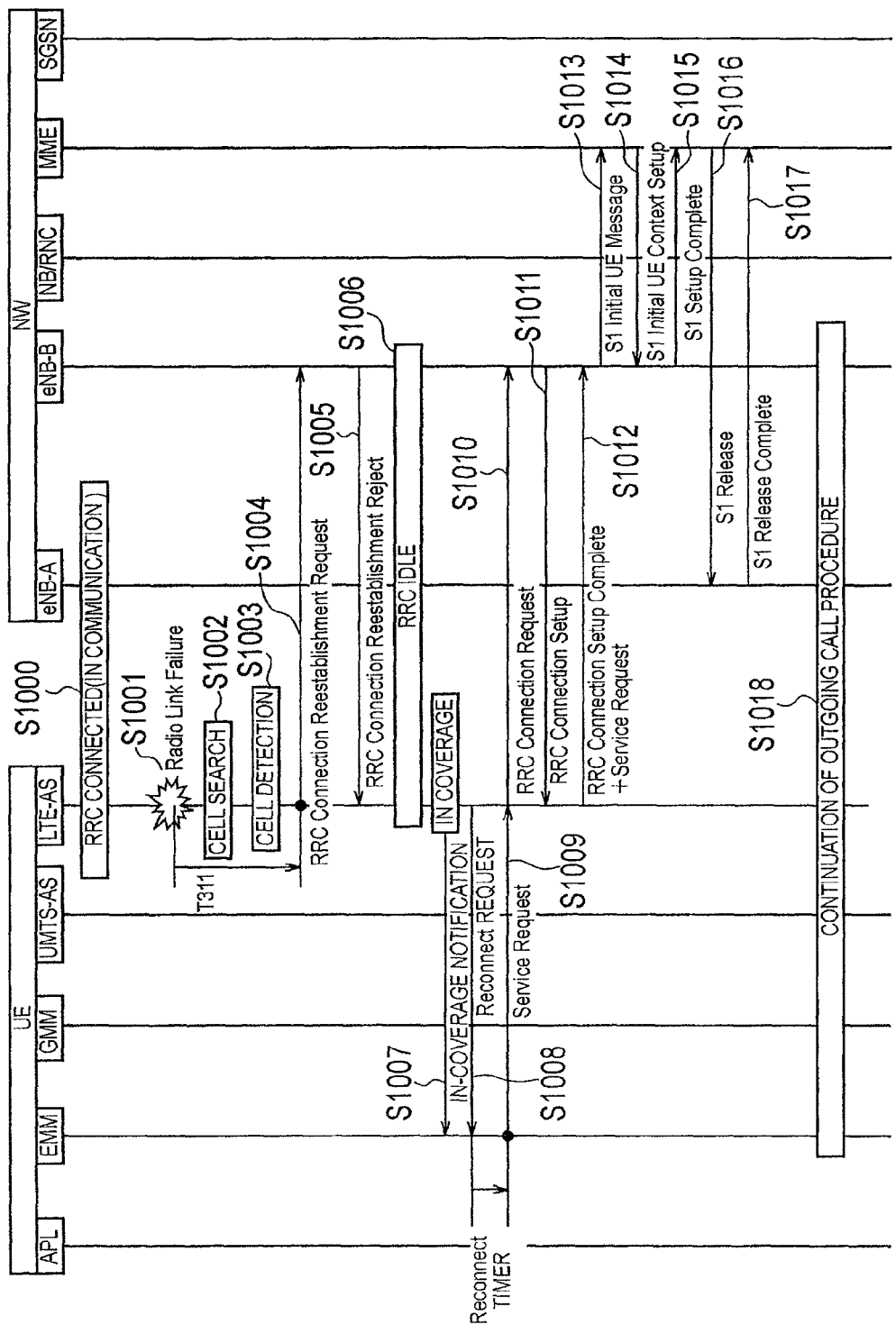
FIG. 3 is a sequence diagram showing operations of the mobile communication system according to the first embodiment of the present invention.

As shown in FIG. 3, when communication via the RRC connection is performed between the LTE-AS function of the mobile station UE and a radio base station eNB-A in step S1000, the LTE-AS function starts a T311 timer when a "Radio Link Failure" is detected in the RRC connection in step S1001.

The LTE-AS function performs cell search in step S1002. When a cell in which communication can be performed (which is a cell under the control of a radio base station eNB-B in the example of FIG. 3) is detected before the expiration of the T311 timer in step S1003, the LTE-AS function transmits an "RRC Connection Reestablishment Request (a reestablishment request)" to the radio base station eNB-B in step S1004.

In step S1005, the radio base station eNB-B transmits an "RRC Connection Reestablishment Reject (a reestablishment rejection response) " to the LTE-AS function of the mobile station UE, because the radio base station eNB-B does not have "UE Context" of the mobile station UE.

In step S1006, the RRC connection between the mobile station UE and the radio base station eNB is changed to an idle state without waiting for expiration of the T311 timer, because the LTE-AS function receives the "RRC Connection Reestablishment Reject (the reestablishment rejection response)".

When there is a cell in which communication can be performed (i.e., within a coverage area), the LTE-AS function transmits an in-coverage notification indicating that fact to the EMM function in step S1007, and transmits "Reconnect request (a reconnection request)" to the EMM function in step S1008.

Upon receipt of the "Reconnect request (the reconnection request)", the EMM function starts a "Reconnect timer (a service request timer)". Note that time to be measured with the "Reconnect timer" may be set up through a network or set to a fixed value.

Here, the EMM function detects that the LTE-AS function is in the coverage area before expiration of the Reconnect timer by way of receiving the above-described in-coverage notification. Accordingly, the EMM function transmits a "Service Request (a service request)" to the LTE-AS function in step S1009.

In step S1010, the LTE-AS function transmits an "RRC Connection Request (an RRC connection request)" to the radio base station eNB-B controlling the cell in which communication can be performed, in response to the "Service Request (the service request)".

In step S1011, the radio base station eNB-B transmits an "RRC Connection Setup (an RRC connection setting)" to the LTE-AS function. In step S1012, the LTE-AS function transmits an "RRC Connection Setup Complete (RRC connection setting completion) " and a "Service Request (a service request) " to the radio base station eNB-B.

In step S1013, the radio base station eNB-B transmits an "S1 Initial UE Message" to the switching center MME. In step S1014, the switching center MME returns an "S1 Initial UE Context Setup" to the radio base station eNB-B.

In step S1015, the radio base station eNB-B transmits an "S1 Setup Complete" to the switching center MME. In step S1016, the switching center MME transmits an "S1 Release" to the radio base station eNB-A to instruct release of the S1 connection established between the radio base station eNB-A and the switching center MME.

In step S1017, the radio base station eNB-A releases the S1 connection established with the switching center MME, and then transmits an "S1 Release Complete" indicating that fact to the switching center MME.

In step S1018, an outgoing call procedure is continued, i.e., an authentication procedure, a security procedure, and a call control procedure are performed after establishment of the above-described S1 connection. This enables communications between the LTE-AS function and the radio base station eNB-B as well as between the LTE-NAS function and the switching center MME.

Secondly, an operation (2) to be performed when a reconnection procedure using the NAS function is normally completed in the mobile communication system according to this embodiment will be described with reference to FIG. 4.

Figure 4:
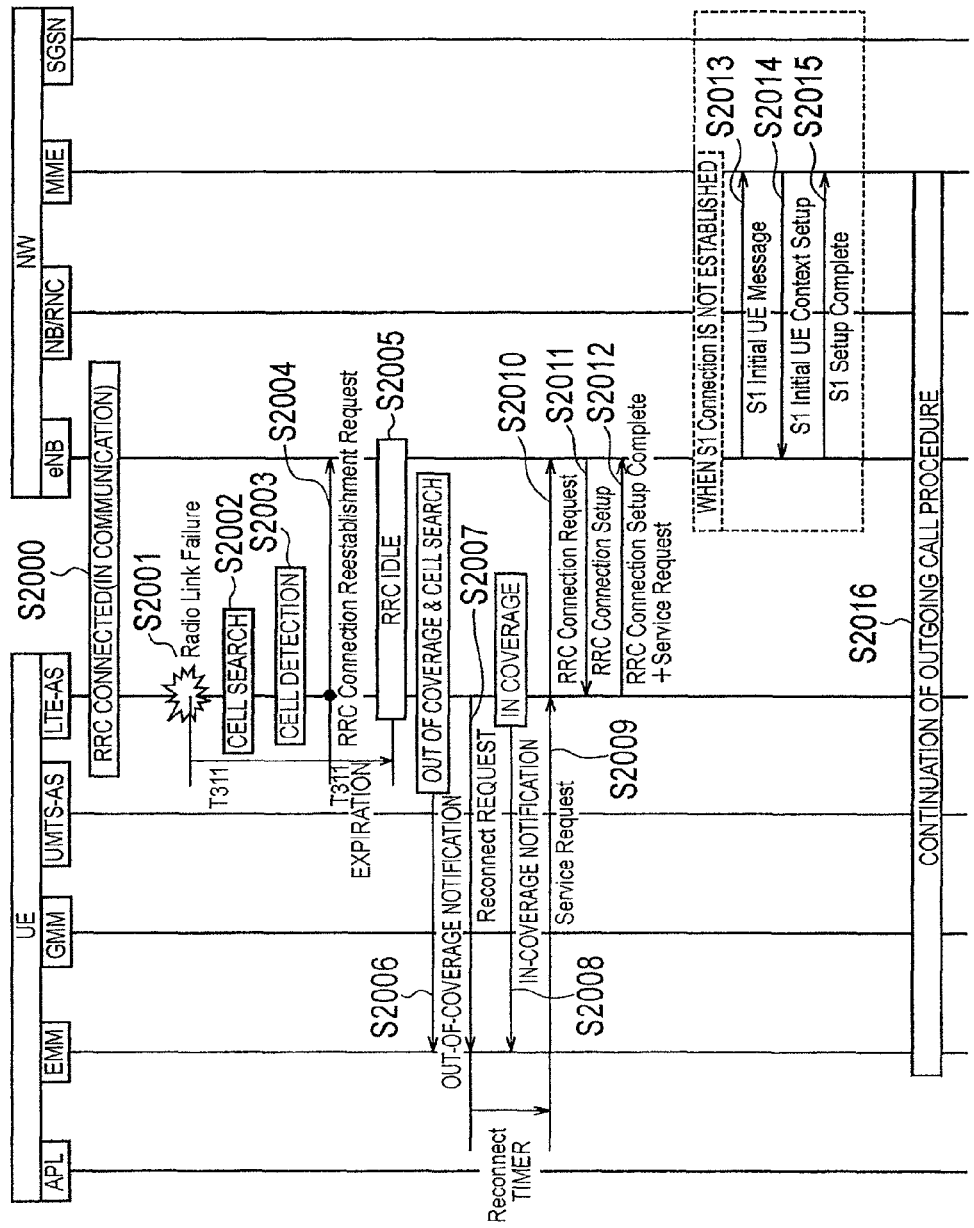
FIG. 4 is a sequence diagram showing operations of the mobile communication system according to the first embodiment of the present invention.

As shown in FIG. 4, when communication via the RRC connection is performed between the LTE-AS function of the mobile station UE and a radio base station eNB-A in step S2000, the LTE-AS function starts a 1311 timer when a "Radio Link Failure" is detected in the RRC connection in step S2001.

The LTE-AS function performs cell search in step S2002. When a cell in which communication can be performed (which is a cell under the control of a radio base station eNB-A in the example of FIG. 4) is detected before expiration of the T311 timer in step S2003, the LTE-AS function transmits an "RRC Connection Reestablishment Request (a reestablishment request)" to the radio base station eNB-A in step S2004.

In step S2005, the RRC connection between the mobile station UE and the radio base station eNB is changed to the idle state, because the T311 timer is expired before the LTE-AS function receives a response to the "RRC Connection Reestablishment Request (the reestablishment request)".

In step S2007, the LTE-AS function checks that there are no cell in which communication can be performed (i.e., out of the coverage area) and transmits an out-of-coverage notification indicating that fact to the EMM function. Moreover, the LTE-AS function transmits a "Reconnect request (the reconnection request)" to the EMM function in step S2008.

Upon receipt of the "Reconnect request (the reconnection request)", the EMM function starts a "Reconnect timer".

Thereafter, in step S2008, the LTE-AS function checks that there is a cell in which communication can be performed now (i.e., within a coverage area now) and transmits an in-coverage notification which indicates that fact to the EMM function.

Here, the EMM function detects that the LTE-AS function is in the coverage area before expiration of the Reconnect timer by means of receiving the above-described in-coverage notification. Accordingly, the EMM function transmits a "Service Request (the service request)" to the LTE-AS function in step S2009.

In step S2010, the LTE-AS function transmits an "RRC Connection Request (an RRC connection request)" to the radio base station eNB-A controlling the cell in which communication can be performed, in response to a "Service Request (the service request)".

In step S2011, the radio base station eNB-A transmits an "RRC Connection Setup (an RRC connection setting)" to the LTE-AS function. In step S2012, the LTE-AS function transmits an "RRC Connection Setup Complete (RRC connection setting completion) " and a "Service Request (a service request)" to the radio base station eNB-A.

Here, when the S1 connection is not established between the radio base station eNB-A and the switching center MME, the radio base station eNB-A transmits an "S1 Initial UE Message" to the switching center station MME in step S2013. The switching center MME returns an "S1 Initial UE Context Setup" to the radio base station eNB-B in step S2014. The radio base station eNB-A transmits an "S1 Setup Complete" to the switching center MME in step S2015.

Thereafter, in step S2016, an outgoing call procedure is continued, i.e., an authentication procedure, a security procedure, and a call control procedure are performed. This enables communications between the LTE-AS function and the radio base station eNB-A as well as between the LTE-NAS function and the switching center MME.

Thirdly, an operation to be performed when a reconnection procedure using the NAS function is abnormally completed in the mobile communication system according to this embodiment will be described with reference to FIG. 5.

Figure 5:
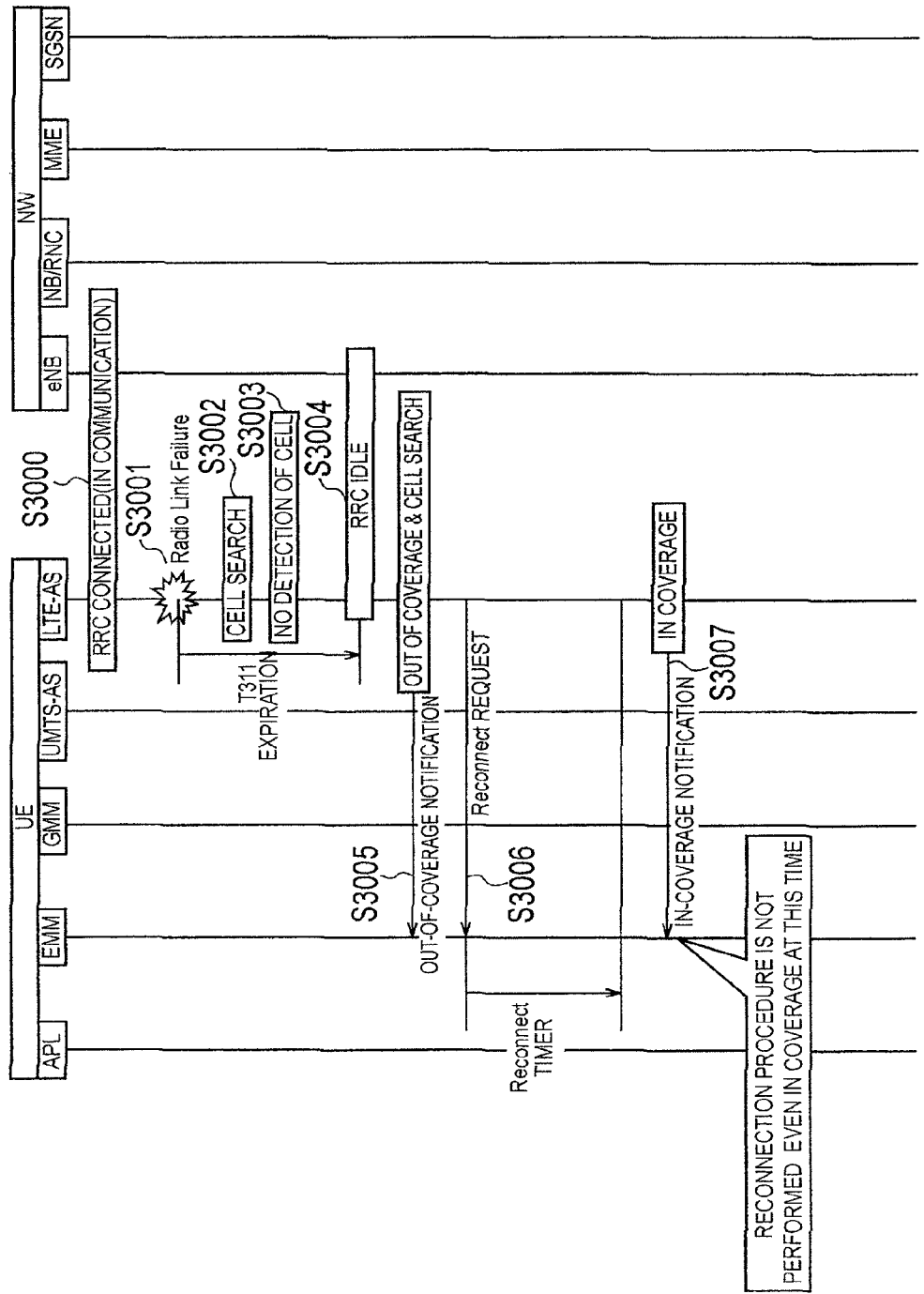
FIG. 5 is a sequence diagram showing operations of the mobile communication system according to the first embodiment of the present invention.

As shown in FIG. 5, when communication via the RRC connection is performed between the LTE-AS function of the mobile station UE and a radio base station eNB-B in step S3000, the LTE-AS function starts a T311 timer when a "Radio Link Failure" is detected in the RRC connection in step S3001.

The LTE-AS function performs the cell search in step S3002. Since the LTE-AS function cannot detect the cell in which communication can be performed before expiration of the T311 timer in step S3003, the RRC connection between the mobile station UE and the radio base station eNB is changed to the idle state in step S3004.

In step S3005, the LTE-AS function checks that there are no cell in which communication can be performed (i.e., out of the coverage area) and transmits an out-of-coverage notification indicating that fact to the EMM function. Moreover, the LTE-AS function transmits an "Reconnect request (the reconnection request)" to the EMM function in step S3006.

Upon receipt of the "Reconnect request (the reconnection request)", the EMM function starts a "Reconnect timer".

Thereafter, since the EMM function cannot detect that the LTE-AS function is in the coverage area before expiration of the Reconnect timer, the EMM function does not transmit a "Service Request (the service request)" to the LTE-AS function in step S3007, even when an in-coverage notification is received from the LTE-AS function.

Fourthly, an operation (3) to be performed when a reconnection procedure using the NAS function is normally completed in the mobile communication system according to this embodiment will be described with reference to FIG. 6.

Figure 6:
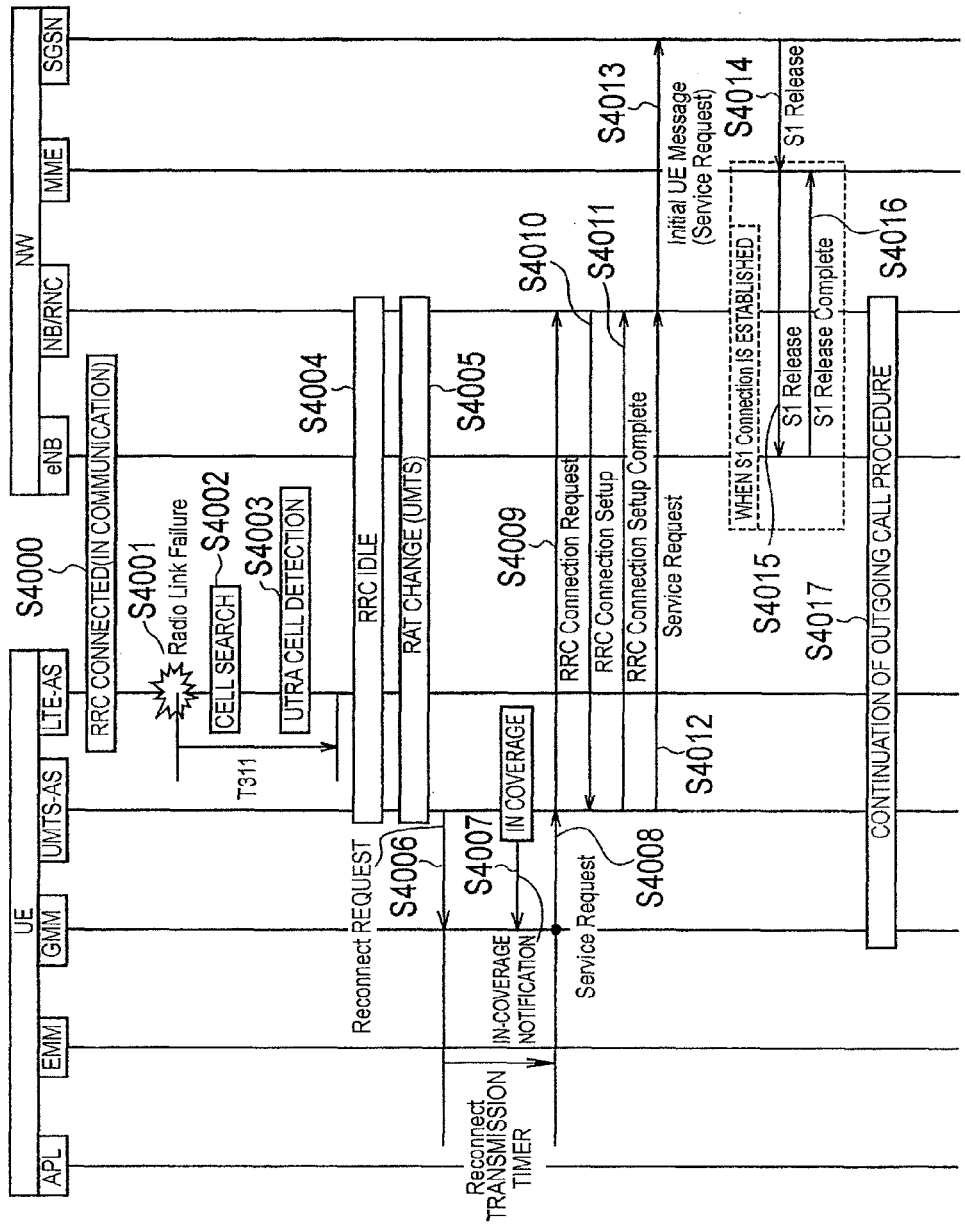
FIG. 6 is a sequence diagram showing operations of the mobile communication system according to the first embodiment of the present invention.

As shown in FIG. 6, when communication via the RRC connection is performed between the LTE-AS function of the mobile station UE and a radio base station eNB-A in step S4000, the LTE-AS function starts a T311 timer when a "Radio Link Failure" is detected in the RRC connection in step S4001.

The LTE-AS function performs the cell search in step S4002, and detects a cell in which communication can be performed of a UTRA (UMTS Terrestrial Radio Access) scheme in step S4003 before expiration of the T311 timer.

In this case, in step S4004, the RRC connection between the mobile station UE and the radio base station eNB is changed to the idle state without transmitting an "RRC Connection Reestablishment Request (the reestablishment request)" by the LTE-AS function and without waiting for expiration of the T311 timer.

In step S4005, a change is made so as to allow the UMTS-AS function to perform the reconnection procedure instead of the LTE-AS function.

In step S4006, the UMTS-AS function transmits a "Reconnect request (the reconnection request)" to the GMM function in step S4006. In step S4007, the UMTS-AS function checks that there is a cell in which communication can be performed (i.e., within the coverage area) and transmits an in-coverage notification indicating that fact to the GMM function.

Figure 7:
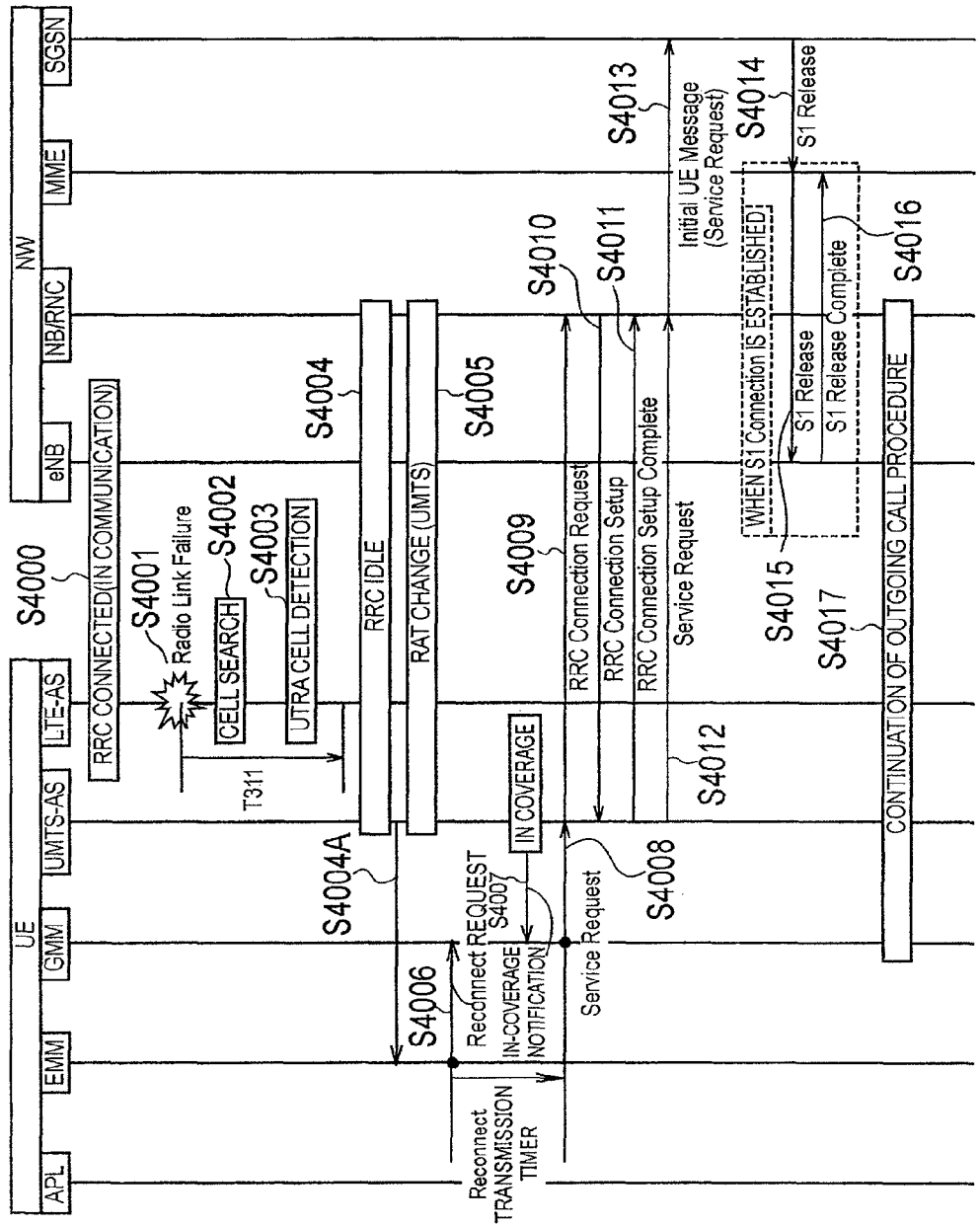
FIG. 7 is a sequence diagram showing operations of the mobile communication system according to the first embodiment of the present invention.

Alternatively, after the RRC connection between the mobile station UE and the radio base station eNB is changed to the idle state as described above in step S4004, the LTE-AS function may transmit a "Reconnection request (the reconnection request)" to the EMM function in step S4004A, and may change RAT in step S4005 (see FIG. 7). In this case, the EMM function needs to transmit the "Reconnect request (the reconnection request)" to the GMM function in step S4006.

Upon receipt of the "Reconnect request (the reconnection request)", the GMM function starts a "Reconnect timer".

Here, the GMM function detects that the UMTS-AS function is in the coverage area before expiration of the Reconnect timer by way of receiving the above-described in-coverage notification. Accordingly, the GMM function transmits a "Service Request (a service request)" to the UMTS-AS function in step S4008.

In step S4009, the UMTS-AS function transmits an "RRC Connection Request (an RRC connection request)" to the radio base station NB and the radio control station RNC controlling the cell in which communication can be performed, in response to the "Service Request (the service request)".

In step S4010, the radio control station RNC transmits an "RRC Connection Setup (an RRC connection setting)" to the UMTS-AS function. In step S4011 and step 4012, the UMTS-AS function transmits an "RRC Connection Setup Complete (RRC connection setting completion)" and a "Service Request (a service request)" to the radio base station NB and the radio control station RNC.

In step S4013, the radio control station RNC transmits an "S1 Initial UE Message" and a "Service Request" to the switching center SGSN.

Thereafter, the switching center SGSN transmits an "S1 Release" to the switching center MME to instruct the release of the S1 connection established between the radio base station eNB and the switching center MME.

Here, when the S1 connection is established, the switching center MME transmits an "S1 Release" to the radio base station eNB to instruct the release of the S1 connection established between the radio base station eNB and the switching center MME in step S4015.

In step S4016, the radio base station eNB releases the S1 connection established with the switching center MME, and then transmits an "S1 Release Complete" indicating that fact to the switching center MME.

In step S4017, an outgoing call procedure is continued, i.e., an authentication procedure, a security procedure, and a call control procedure are performed, after establishment of the above-described Iu connection. This enables communications between the UMTS-AS function and both of the radio base station NB and the radio control station RNC, as well as between the UMTS-NAS function and the switching center SGSN.

(Advantageous Effects of Mobile Communication System According to First Embodiment of the Present Invention)

According to the mobile communication system of the first embodiment of the present invention, when the RRC connection is in the idle state, the EMM function can release the S1 connection that remains without being cut off after the RCC connection turns into the idle state by transmitting the Service Request in response to receipt of the in-coverage notification and the Reconnect request from the LTE-AS function.

As a result, it is possible to eliminate a trouble that would be caused when the switching center MME transfers an incoming signal and the like addressed to the mobile station UE to the radio base station eNB with which the RRC connection is not established.

Moreover, according to the mobile communication system of the first embodiment of the present invention, the EMM function is configured not to transmit the Service Request even when the LTE-AS function enters the coverage area after expiration of the Service Request timer. Thereby, it is possible to avoid useless transmission of the Service Request.

(Modification)

Note that operation of the above described switching center MME, the radio base station eNB and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the switching center MME, the radio base station eNB and the mobile station UE. Also, the storage medium and the processor may be provided in the switching center MME, the radio base station eNB and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in which a mobile station performs communication via a first connection between the mobile station and a radio base station and a second connection between the radio base station and a switching center by use of a first protocol function and a second protocol function, wherein the first protocol function performs processing corresponding to a first protocol which terminates between the mobile station and the radio base station;

the second protocol function performs processing corresponding to a second protocol which is an upper protocol of the first protocol and terminates between the mobile station and the switching center; and the method comprises the steps of:

transmitting, from the first protocol function to a second radio base station which manages a cell detected by performing a cell search, a connection reestablishment request, after detecting a "Radio Link Failure" in a first connection established between the first protocol function and a first radio base station;

transmitting, from the second radio base station to the first protocol function, a connection reestablishment reject, when the second radio base station receives the connection reestablishment request; and transmitting, a service request by the second protocol function when the first protocol function receives the connection reestablishment reject.

2. A mobile station configured to perform communication via a first connection between the mobile station and a radio base station and a second connection between the radio base station and a switching center by use of a first protocol function and a second protocol function, wherein the first protocol function is configured to perform processing corresponding to a first protocol which terminates between the mobile station and the radio base station;

the second protocol function is configured to perform processing corresponding to a second protocol which is an upper protocol of the first protocol and terminates between the mobile station and the switching center;

the first protocol function is configured to detect a "Radio Link Failure" in the first connection; and the second protocol function is configured to transmit a service request, when the first connection changes into an idle state.

3. The mobile communication method according to claim 1, wherein the method further comprises the steps of:

releasing the first connection at the first radio base station and the switching center, and establishing a second connection at the second radio station and the switching center, in response to the service request transmitted by the first protocol function.

4. A mobile station configured to perform communication via a first connection between the mobile station and a radio base station and a second connection between the radio base station and a switching center by use of a first protocol function and a second protocol function, wherein the first protocol function is configured to perform processing corresponding to a first protocol which terminates between the mobile station and the radio base station;

the second protocol function is configured to perform processing corresponding to a second protocol which is an upper protocol of the first protocol and terminates between the mobile station and the switching center;

the first protocol function is configured to transmit a connection reestablishment request to a radio base station which manages a cell detected by performing a cell search, and receive a connection reestablishment reject from the radio base station which manages the cell, after detecting a "Radio Link Failure" in a first connection; and the second protocol function is configured to transmit a service request, when the connection reestablishment reject is received by the first protocol function.

5. A mobile communication method in which a mobile station performs communication via a first connection between the mobile station and a radio base station and a second connection between the radio base station and a switching center by use of a first protocol function and a second protocol function, wherein the first protocol function performs processing corresponding to a first protocol which terminates between the mobile station and the radio base station;

the second protocol function performs processing corresponding to a second protocol which is an upper protocol of the first protocol and terminates between the mobile station and the switching center; and the method comprises the steps of:

transmitting, a service request by the second protocol function, when the first connection changes in an idle state, after detecting a "Radio Link Failure" in the first connection established between the first protocol function and a first radio base station.

6. The mobile communication method according to claim 5, wherein the method further comprises the steps of:

releasing the first connection at the first radio base station and the switching center, and establishing the second connection at the second radio station and the switching center, in response to the service request transmitted by the first protocol function.

* * * * *